Oct. 10, 1939.  T. H. THOMPSON  2,175,230
VEHICLE-SPRING LINER
Filed Jan. 24, 1938  2 Sheets-Sheet 1
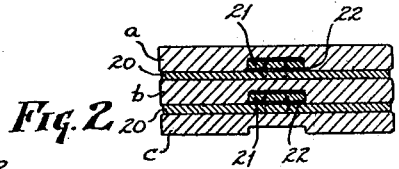
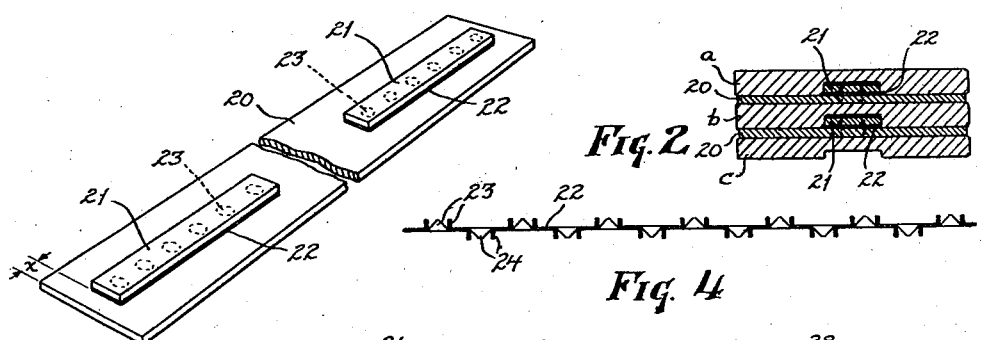
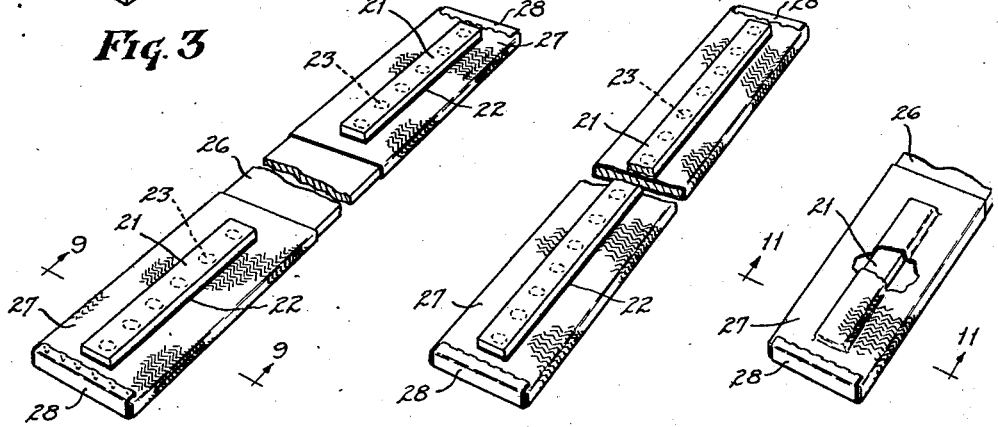
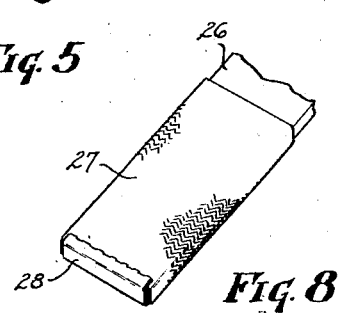
INVENTOR.
TOM H. THOMPSON
BY Bates, Gohrick, + Teare
ATTORNEYS Oct. 10, 1939.   T. H. THOMPSON   2,175,230
VEHICLE-SPRING LINER
Filed Jan. 24, 1938   2 Sheets-Sheet 2

INVENTOR.
TOM H. THOMPSON
BY Bates, Golrick, & Teare
ATTORNEYS

Patented Oct. 10, 1939

2,175,230

UNITED STATES PATENT OFFICE 2,175,230

VEHICLE-SPRING LINER

Tom H. Thompson, Cleveland, Ohio, assignor to The Cleveland Graphite Bronze Company, Cleveland, Ohio, a corporation of Ohio Application January 24, 1938, Serial No. 186,571

13 Claims. (Cl. 267—47)

This invention is directed to improvements in spring liners and is particularly concerned with liners or inserts utilizable in leaf spring assemblies for automotive use.

In my prior patents and applications I have set forth the advantages to be obtained through the incorporation, in automotive spring assemblies of the leaf spring type, of elongated strips of material between the respective spring leaves, to control the friction factor of the spring assembly when the same becomes subjected to loads and usage in a vehicle. Satisfactory results were obtained by the use of materials of certain classes, as set forth in said patents and patent applications. However, the advantages of having inserts, which extend substantially throughout the length of the respective spring leaves comprising the spring assemblage, have been offset somewhat in a commercial sense, by the quantity of the materials required and the costs thereof. To separate, economically, each spring leaf properly from the adjacent spring leaves by the use of such inserts requires that the materials used therein be of low cost and be processed in such manner as to efficiently fulfill the intended functions. Wherefore, the general object of the present invention is to derive a spring insert or liner construction and method of making the same, whereby the inserts can be economically produced while obtaining the advantages of durability under varying loads and weather conditions, and which will function to produce a predetermined, constant, friction factor control in the spring assembly after the same has been placed in use.

A further object of the present invention is to provide a liner structure, wherein the outer end portions of the liner which are subjected to the greater wear and exposure are constructed in such manner as to increase the strength thereof without interfering with the desired friction control functioning of the liner.

Figure 9:
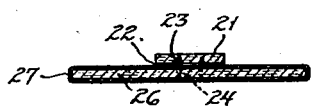
Figure 11:
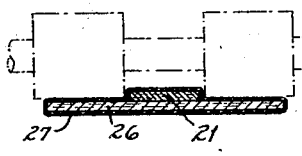
Figure 10:
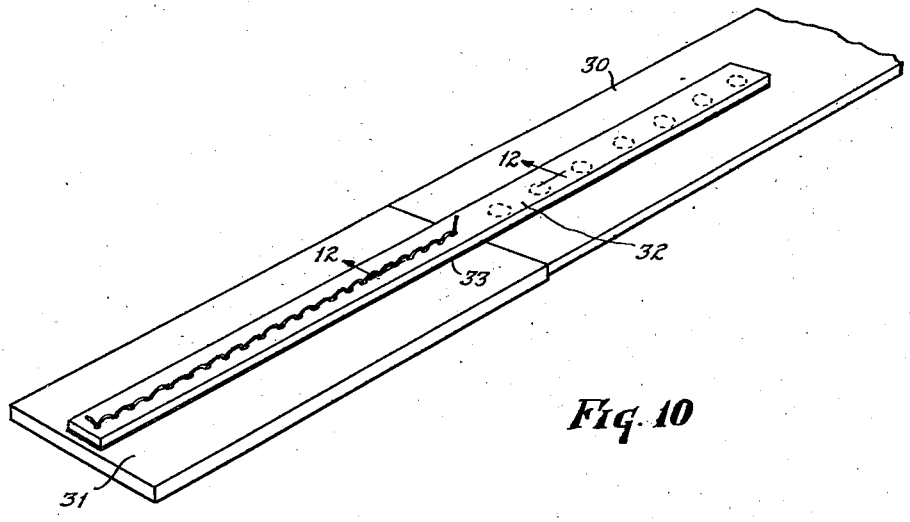
Figure 12:
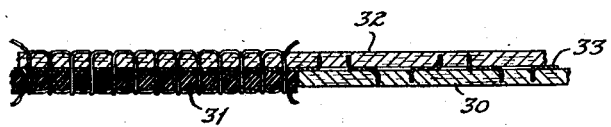

In the drawings, Fig. 1 is a side elevational view of a leaf spring assembly incorporating certain features of my invention; Fig. 2 is a cross-sectional view of three grooved leaf springs with inserts disposed therebetween; Fig. 3 is a perspective view of one embodiment of my invention, for use in combination with a spring assembly, wherein the spring laminations are grooved; Fig. 4 is a longitudinal cross-sectional view of a metallic binder strip which serves the purpose of securing two laminations of an insert or liner material together when the liner comprises more than one lamination of material; Fig. 5 is a perspective view of another form of my invention; Figs. 6 and 7 are perspective views illustrating modifications of the liner construction shown in Fig. 5; Fig. 8 is a perspective view of one form of my improved liner, wherein no rib construction is incorporated; Fig. 9 is a cross-sectional view of the liner illustrated in Fig. 5, taken substantially along the line 9—9 of Fig. 5; Fig. 10 illustrates a further embodiment of my invention; Fig. 11 is a cross-sectional view taken substantially along the line 11—11 of the liner construction shown in Fig. 7; Fig. 12 is a cross-sectional view, taken substantially along the line 12—12 of the liner construction illustrated in Fig. 10.

These liners may extend the full length of the spring assembly, or they may be inserted in pairs between adjacent spring leaves with the outer ends thereof extending slightly beyond the ends of the shorter of two adjacent spring leaves. The end portions, at least, of the liners are constructed and treated in such manner as to withstand long wear under varying weather conditions.

I have found that liners constructed as generally disclosed in my Patent 2,105,869, issued January 18, 1938, lack somewhat in tensile strength and durability at the outer end portions thereof, due to sand and small stone abrasions and weather influences. I have overcome this disadvantage by providing the liner end portions with a protective means which will not interfere with the functioning of the liner in producing a predetermined friction factor control. Such a protective means may comprise a film applied to or formed on the liner end portions comprising cellulose acetate, nitrocellulose lastics, vinyl, styrol and other plastic base materials which can be used economically and the compounding of which can be controlled in such manner as to produce a suitable film which will not interfere with the desired controlling of the friction factor of the liner.

In the drawings and following specification I have disclosed such a protective means in the form of treated fabric coverings for the end portions of the liners associated with other features of my invention.

I have illustrated in the drawings five embodiments of spring insert or liner constructions utilizable in spring assemblies, wherein the spring leaves are grooved, such grooved springs being shown in Figs. 1 and 2. I have also illustrated in the drawings one form of liner construction, utilizable in spring assemblies wherein the spring leaves are not grooved.

In Fig. 1 I show a liner or spring insert, the body of which comprises an elongated strip of material 20, preferably formed of a fibrous material such as a low-grade paper board stock, less than a tenth of an inch in thickness and of a width substantially equal to the width of spring leaves a, b, c, d, e. I obtain in these liner constructions, characteristics which can be controlled or varied to obtain a constant friction factor of any desired specification, the latter being dependent partially upon the load rating of the spring. The materials forming the strip 20 may be treated with a mixture of paraffin, montan wax and diphenyl, the montan wax being used to increase the melting point of the paraffin and to add strength to the paper stock. Upon the upper face of the liner body 20, I attach an additional lamination or laminations in the form of rib members 21, which are fixed adjacent the ends of the liner, or, if desired, entirely along the center thereof, whereby the ribs, when secured to the liner, will fit into the grooves of the leaf springs adjacent the ends of the respective spring leaves. I prefer to have the rib ends terminate slightly inwardly from the ends of the liner 20, when the liners are to be used in spring assemblies wherein the grooved spring leaf ends are of tapering depth. The ribs 21 may be secured to the liner lamination 20 by stitching or stapling. However, I prefer to use a preformed metallic binding strip, such as is illustrated in Fig. 4 in cross-section, the binding strip comprising cold rolled steel about ten-thousandths of an inch in thickness and of a width substantially the width of the rib or ribs 21.

As shown in Fig. 4, the metal binding strip 22 has formed thereon upwardly and downwardly extending clusters of prongs 23 and 24, respectively, which, when the laminations 20 and 21 are assembled, cut into the laminations and serve as a bond for said laminations, the binding strip 22 being placed between the laminations at the time of assembly.

In Figs. 5 to 7, inclusive, and Fig. 10 I show modifications of the multiple lamination liner construction illustrated in Fig. 3. In these constructions the fibrous liner body or core 26 may be of less thickness than the fibrous liner 20, the core 26 being faced with a fabric covering 27, which covering may extend the full length of the liner, as shown in Fig. 6, or only the ends of the core may be covered, as shown in Figs. 5, 7 and 8. I prefer to have this covering applied to the liner in the form of a seamless tube of fabric, as shown, although, if desired, only the top and bottom faces of the liner core need be fabric surfaced. The fabric tube 27 can be of a herring-bone or a buggy-whip weave and be so dimensioned as to snugly enclose the fibrous liner core 26. The liner, with the fabric thereon, is subjected to a soaking coating or waxing treatment, hereinbefore referred to. If desired, these structures may be subjected to considerable pressure to cause the weave indulations of the fabric surface to be impressed upon the top and bottom surfaces of the liner core, preferably by rolling or calendering, and this treatment imparts to the upper and lower faces of the fabric smooth leaf spring bearing surfaces. However, if the covering is intimately applied to the core, subsequent use of the liner between the spring leaves will cause the fabric to be pressed into the surfaces of the core. I prefer to bind the ends of the fabric-covered liner with metallic strips, such as are shown at 28 in Figs. 5 to 8, inclusive, to assist in preventing sand and gravel erosion upon the exposed liner ends. If desired, the fabric can be folded over the exposed core ends for the same purpose.

It should be noted in the construction shown in Fig. 7 that the lamination or strip member 21 is disposed within the fabric covering 27, and in this construction the calendering can be effected by a roll, such as is illustrated by the dot and dash lines in Fig. 11, the roll serving to compress the fabric into the faces of the core member 26, and also to stretch the fabric over the rib or lamination 21, to thereby cause an accurate defining of the effective width of the rib 21 and to cause the fabric to hold the rib in position.

In Fig. 10 I show still another liner construction, wherein the ends of the liner are provided with resilient members, preferably formed of compressible rubber, and of such length as to be disposed intermediate the end portion of a spring leaf and the flat face of an adjacent spring leaf. This construction may comprise a liner section 30 formed of any suitable material and preferably extending the major portion of the length of the spring leaf, and end sections 31 of substantially the same thickness as the liner member 30 and formed of resilient material. In the illustration shown, the construction of the liner is adapted for use with grooved springs, and the resilient section 31 is secured to the liner section 30 by a lamination or rib member 32, the lamination or rib member 32 being secured to the liner member 30 by a bonding strip 33, (see Fig. 12). That portion of the bonding strip disposed between the rib or lamination 32 and the liner member 30 may be provided with the prong formations, hereinbefore described, while that portion of the binding strip 33, which is disposed between the rib member 32 and the resilient section 31 may be stitched to the respective members, as shown in Figs. 10 and 12.

It is to be understood that the liner core 26, (see Figs. 5, 7 and 8) may comprise more than one lamination of material secured together by a metallic binding strip or strips, such as the strip 22, and the assembly thereof effected in the manner described. Accordingly, where reference is made in the appended claims to a liner formed of a plurality of laminations bound together by a binder strip, the liner structure thus claimed is not limited to a liner or insert having a fabric facing nor to a rib lamination.

I claim:

1. An automotive spring liner for leaf springs, comprising a strip of flexible non-metallic material forming the liner core, and of substantially less thickness than the thickness of the spring leaves between which the liner is adapted to be inserted and a seamless fabric covering surrounding the core, the strands of which are pressed intimately into contact with the core body, said covering material and the core material being treated with an anti-friction substance.

2. A spring liner, adapted to be inserted between the leaves of an automotive spring, comprising an elongated strip of material formed of compresed fibers and a fabric material covering the end portions of the core material, said materials being in intimate contact with each other, whereby the strands of the fabric material will become embedded in the core material to a sufficient extent to prevent slippage between the two materials when the liner is used between spring leaves, said liner being treated with a weather-proofing and lubricating substance, which also tends to bind the two materials, comprising the liner, together.

3. An automotive spring liner for leaf springs, comprising a strip of fibrous material forming the liner core and of substantially the width of the leaves of the spring between which the liner is adapted to be inserted and fabric material covering the bearing surfaces of the core, the strands of which will be pressed intimately into contact with the core body when the liner is in use, said covering material and the core material being treated with a friction-reducing and weather-proofing substance.

4. An automotive spring liner for leaf springs, comprising a strip of fibrous material forming the liner core and of substantially the width of the leaves of the spring between which the liner is adapted to be inserted and fabric layers covering the bearing surfaces of the core, said covering material being treated with a friction-reducing substance.

5. A spring liner adapted to be inserted between the leaves of an automotive spring, comprising an elongated strip of fibrous material and a seamless fabric material intimately surrounding the core material, said materials being treated with a weather-proofing and lubricating substance which also tends to bind the two materials, comprising the liner body, together.

6. An automotive spring liner for leaf springs, comprising a strip of fibrous material forming the liner core and of substantially the width of the leaves of the spring between which the liner is adapted to be inserted and fabric layers covering the bearing surfaces of the core, the strands of which are in intimate contact with the core body, to prevent slippage between the core and cover, said covering material and the core material being treated with a weather-proofing substance.

7. A spring liner adapted to be inserted between the leaves of an automotive spring, comprising an elongated strip of fibrous material and fabric layers covering the bearing surfaces of the core material, said materials being pressed into intimate contact with each other whereby the strands of the fabric material are embedded in the outer surfaces of the core material to a sufficient extent to prevent slippage between the two materials when the liner is in use.

8. A spring liner adapted to be inserted between the leaves of an automotive spring, comprising an elongated strip of fibrous material and a fabric material surrounding the core material, said materials being in intimate contact with each other, and said materials being treated wth a weather-proofing and lubricating substance which also tends to bind the two materials comprising the liner body together to a sufficient extent to prevent slippage between the two materials when the liner is in use.

9. An automotive spring liner for leaf springs, comprising a strip of flexible material forming the liner core and of substantially less thickness than the thickness of the spring leaves between which the liner is adapted to be inserted, said core strip having a relatively low tensile strength and a seamless fabric covering surrounding the core, the strands of which are pressed intimately into contact with the core body to thereby increase the tensile strength of the liner, and a binding substance between the fabric and core.

10. An automotive spring liner for leaf springs, comprising a strip of flexible material forming the liner core and of substantially less thickness than the thickness of the spring leaves between which the liner is adapted to be inserted, said core strips having relatively low tensile strength, and layers of fabric covering the bearing surfaces of the core, the strands of which are in intimate contact with the core body, and tending to increase the tensile strength of the liner, and binder means securing the fabric material to the core body.

11. A spring liner adapted to be inserted between leaves of an automotive spring, comprising an elongated strip of fibrous material of relatively low tensile strength and strips of fabric material covering the upper and lower faces of the core material, said materials being pressed into intimate contact with each other, whereby the strands of the fabric materials are caused to be embedded in the core material to a sufficient extent to prevent slippage between the two materials and binder means securing the fabric coverings to the core material.

12. A spring liner adapted to be inserted between leaves of an automotive spring, comprising an elongated strip of fibrous material and strips of fabric covering the upper and lower faces of the core material, and metallic clips disposed at the end of the liner tending to secure the fabric material and cover material together, and protect the liner end.

13. A spring liner adapted to be inserted between leaves of an automotive spring, comprising an elongated strip of fibrous material and a seamless fabric material surrounding the core material, said materials being pressed into intimate contact with each other, whereby the strands of the fabric materials are caused to be embedded in the core material to a sufficient extent to prevent slippage between the two materials and metallic clips engaging the ends of top and bottom parts of said fabric material to thereby serve to secure the same to the fibrous material.

TOM H. THOMPSON.